April 27, 1954  G. L. DU ROSTU  2,676,685
ELECTROMAGNETIC CLUTCH
Filed Nov. 26, 1949
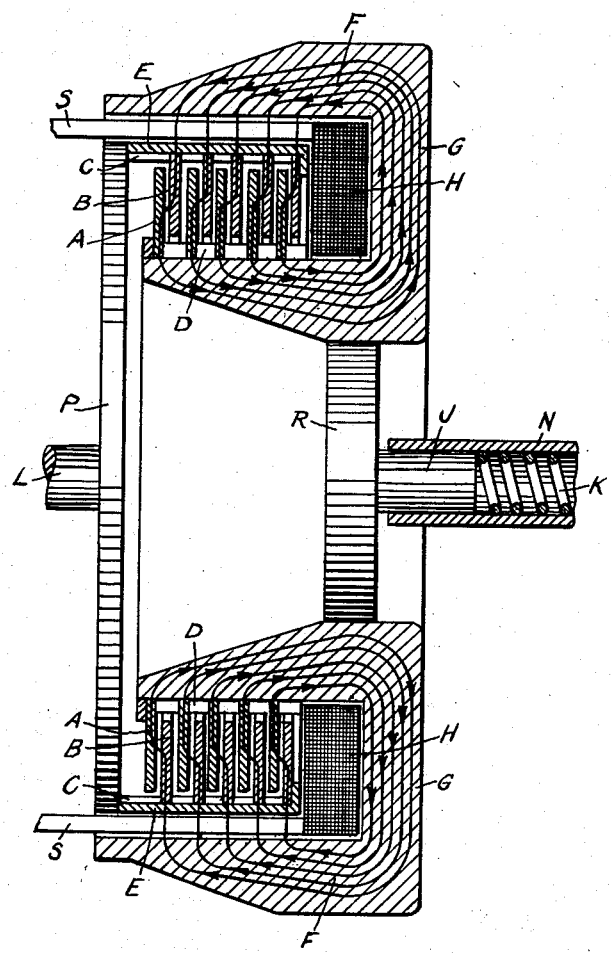
INVENTOR.
GEORGES LEVESQUE DU ROSTU
BY
ATTORNEY Patented Apr. 27, 1954

2,676,685

UNITED STATES PATENT OFFICE 2,676,685

ELECTROMAGNETIC CLUTCH

Georges Levesque du Rostu, Paris, France, assignor to Société Anonyme, André Citroën, Paris, France Application November 26, 1949, Serial No. 129,683

Claims priority, application France March 14, 1946

1 Claim. (Cl. 192—84)

In the application for Letters Patent Ser. No. 706,024, filed October 26, 1946, now Patent No. 2,512,065, of which the present application is a continuation-in-part, an electromagnetic clutch is described which comprises a pair of unequal coaxial discs of which the one smaller in diameter is mounted for sliding motion, two sets of interleaved rings set in opposite rims rigid with and at right angles to the peripheries of the respective discs, a U-shaped magnetic yoke the two legs of which straddle or encompass the aforesaid pair of rims at quite a small distance therefrom and in the bottom of which the magnet-energizing coil is housed and a spring adapted to return the slidable disc for the purpose of disengaging the ring sets from one another.

This invention relates to a modification of such a clutch in which the magnetic yoke is rotatable while the coil is stationary.

The advantage resulting from such an arrangement is that the magnetic yoke can be used as a flywheel, as is apparent from the drawing, the single figure of which illustrates in axial section the arrangement according to this invention.

This figure shows the pair of coaxial shafts L and J. Rigid with shaft L and rotating therewith is a disk P carrying a rim E secured at right angles and in overhanging relationship thereto. This rim is formed on its inner face with bars C parallel with said coaxial shafts.

An annular yoke G having a U-shaped radial section is rotatably rigid with shaft J through the medium of the disc R which is connected to shaft J and yoke G, and the branches of the U-shaped radial section are positioned externally and internally of rim E, respectively, so as to enclose it. As shown, the axial portion of yoke G which registers with rim E is also formed with corresponding bars D.

Two concentrical sets of notched rings are slidably splined on these bars in such manner that the rings A of the inner set are splined on bars D and interleaved with rings B of the outer set splined on bars C.

The electromagnet coil H is carried by a stationary cylindrical support S. When energizing current is caused to flow through coil H, the magnetic flux F passes through the energized yoke G, thereby attracting the rings A and B so that these rings will be coupled by pairs and cause shaft J to drive shaft L. It will be noted that both rings A and B may slide axially along the bars C and D to permit the rings to adhere to one another in pairs.

When the supply of energizing current is interrupted the rings will no more adhere to each other although they will remain in close relationship and shaft J will be released relative to shaft L.

In the cylinder N surrounding the shaft J, a spring K may be mounted for urging the shaft J and the disc R associated with it in the direction of the shaft L and its associated disc P for maintaining these shafts flexibly associated and for returning the shaft J and the disc R to their initial positions in the event one of the rings A and B becomes canted and causes the yoke to be moved to the right upon energization of the coil H.

What I claim is:

A clutch comprising a driving shaft and a driven shaft forming together a pair of coaxial shafts, a disk carried by one of said shafts and at right angles thereto, a rim secured at right angles and in overhanging relationship to the peripheral edge of said disk and comprising bars parallel to said one shaft, a set of rings of magnetic metal having notched peripheral edges, splined on said bars, a yoke supporting member rigid with said other shaft, a ring shaped yoke movable with respect to said first-named shaft and surrounding said other shaft, said yoke being carried by said supporting member and having a U-shaped radial section, the branches of said U-shaped section enclosing said rim, the yoke portion registering with said rim bars being also provided with bars parallel to said rim bars, another set of rings also formed with peripheral notches and slidably engaged on said yoke bars, said other set of rings being interleaved with the rings of said rim, a fixed coil disposed in the hollow portion forming the bottom of said U-sectioned yoke, a stationary sleeve carrying said coil and passing between said rim and that yoke portion which corresponds to the outer branch of said U-shaped section, and a spring acting on said disk in the clutch releasing direction for separating said rings from one another.

References Cited in the file of this patent

UNITED STATES PATENTS

| Number | Name | Date |
|---|---|---|
| 1,622,939 | Bing | Mar. 29, 1927 |
| 1,826,929 | Furnas | Oct. 13, 1931 |
| 2,375,783 | Gilfillan | May 15, 1945 |
| 2,512,065 | Du Rostu | June 20, 1950 |